United States Patent
Müller

(10) Patent No.: US 11,407,315 B2
(45) Date of Patent: Aug. 9, 2022

(54) METHOD FOR DETERMINING A LOAD DISTRIBUTION, CONTROL UNIT, POWERTRAIN AND MOTOR VEHICLE

(71) Applicant: Volkswagen Aktiengesellschaft, Wolfsburg (DE)

(72) Inventor: Johannes Müller, Uetze (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 404 days.

(21) Appl. No.: 16/273,593

(22) Filed: Feb. 12, 2019

(65) Prior Publication Data
US 2019/0248246 A1    Aug. 15, 2019

(30) Foreign Application Priority Data
Feb. 13, 2018    (DE) ..................... 10 2018 202 182.1

(51) Int. Cl.
*B60W 30/188*    (2012.01)
*B60L 15/20*    (2006.01)
(Continued)

(52) U.S. Cl.
CPC ........... *B60L 15/20* (2013.01); *B60L 15/2045* (2013.01); *B60W 30/188* (2013.01); *B60K 6/48* (2013.01); *B60L 2220/42* (2013.01); *B60L 2240/463* (2013.01); *B60L 2260/28* (2013.01); *B60W 10/08* (2013.01); *B60W 20/10* (2013.01);
(Continued)

(58) Field of Classification Search
CPC .. B60L 15/20; B60L 15/2045; B60L 2220/42; B60L 2260/28; B60L 2240/463; B60W 30/188; B60W 10/08; B60W 2720/40; B60W 2540/103;
(Continued)

(56) References Cited

U.S. PATENT DOCUMENTS 5,788,004 A    8/1998 Friedmann et al.
6,275,762 B1    8/2001 Salg
(Continued)

FOREIGN PATENT DOCUMENTS

CN    104442345    3/2015
CN    106043284    10/2016
(Continued)

OTHER PUBLICATIONS

Search report for German Patent Application No. 10 2018 202 182.1, dated Aug. 24, 2018.
(Continued)

*Primary Examiner* — Nadeem Odeh
(74) *Attorney, Agent, or Firm* — Pearl Cohen Zedek Latzer Baratz LLP

(57) ABSTRACT

A method for determining a load distribution in a powertrain of a motor vehicle, whereby the powertrain has at least two drive machines, whereby the first drive machine is provided for a front-wheel drive and the second drive machine is provided for a rear-wheel drive, whereby the method comprises: determining a load distribution characteristic map that is based on a first efficiency characteristic map of the first drive machine and on a second efficiency characteristic map of the second drive machine.

11 Claims, 5 Drawing Sheets

(51) Int. Cl.
   *B60W 10/08* (2006.01)
   *B60K 6/48* (2007.10)
   *B60W 20/10* (2016.01)
(52) U.S. Cl.
   CPC .............. *B60W 2540/103* (2013.01); *B60W 2710/0666* (2013.01); *B60W 2710/083* (2013.01); *B60W 2720/40* (2013.01)
(58) Field of Classification Search
   CPC ... B60W 2710/0666; B60W 2710/083; B60W 20/10; B60K 6/48
   See application file for complete search history.

(56) References Cited

U.S. PATENT DOCUMENTS

| | | | | |
|---|---|---|---|---|
| 8,448,542 | B2* | 5/2013 | Nagamori | B60L 50/16 |
| | | | | 74/665 L |
| 2006/0048988 | A1 | 3/2006 | Dreibholz et al. | |
| 2009/0088914 | A1 | 4/2009 | Mizutani et al. | |
| 2014/0018988 | A1* | 1/2014 | Kitano | B60L 3/12 |
| | | | | 701/22 |
| 2014/0067181 | A1 | 3/2014 | Kato et al. | |
| 2014/0116793 | A1* | 5/2014 | Pelletier | B60K 6/26 |
| | | | | 180/65.225 |
| 2014/0257613 | A1* | 9/2014 | Tang | B60L 15/20 |
| | | | | 701/22 |
| 2016/0297440 | A1 | 10/2016 | Lee | |
| 2017/0050536 | A1* | 2/2017 | Martin | B60K 1/02 |
| 2017/0174097 | A1* | 6/2017 | Gillespey | B60L 3/12 |
| 2018/0079415 | A1* | 3/2018 | Moriya | B60W 30/18145 |
| 2019/0092188 | A1* | 3/2019 | Plianos | B60L 15/2045 |

FOREIGN PATENT DOCUMENTS

| | | |
|---|---|---|
| CN | 106564404 | 4/2017 |
| DE | 195 05 431 A1 | 8/1996 |
| DE | 196 47 507 A1 | 5/1998 |
| DE | 10 2004 043 589 A1 | 4/2006 |
| DE | 10 2008 037 241 A1 | 2/2010 |

OTHER PUBLICATIONS

Chinese Office Action for CN Application No. 201910112549.2 dated Nov. 12, 2021.

* cited by examiner

METHOD FOR DETERMINING A LOAD DISTRIBUTION, CONTROL UNIT, POWERTRAIN AND MOTOR VEHICLE

CROSS-REFERENCE TO RELATED APPLICATIONS

This application claims priority from German Patent Application No. 10 2018 202 182.1, filed Feb. 13, 2018, which is hereby incorporated by reference.

FIELD OF THE INVENTION

The invention relates to a method for determining a load distribution, to a control unit, to a powertrain and to a motor vehicle.

BACKGROUND OF THE INVENTION

When it comes to electric or else hybrid (motor) vehicles that have more than one traction motor or drive motor, for example, a front-wheel drive and a rear-wheel drive, there is a degree of freedom regarding the load distribution between the different drive motors. The load distribution can be configured such that either the vehicle has a maximum driving performance (e.g. acceleration in the range from 0 to 100 km/h) or else the vehicle attains a minimum consumption of fuel, electric energy or the like.

It is generally known that the driver of the vehicle selects a mode of operation in which the load distribution is appropriately controlled, e.g. a sport mode in which the load distribution is selected for maximum driving performance or an "eco" mode in which the load distribution is selected for optimal efficiency.

Moreover, a load distribution that is influenced by slip is known, wherein, for example, the four-wheel drive is switched on when slip is detected (e.g. on wet roads).

These solutions, however, only yield a simple load distribution that generally comprises only a fixed value for the distribution of the load.

German Preliminary Published Application DE 10 2004 043 589 A1 discloses a device and a method for determining the drive power distribution in a hybrid powertrain of a motor vehicle. Depending on the driving mode, e.g. dynamic or economic, a target load state of an energy storage device is determined and, depending on the target load state, an operating scenario of the powertrain is determined. Based on the target load state and on the operating scenario, a target drive power for an electric machine of the powertrain is determined. Subsequent to that, the target drive power for an internal combustion engine and for the electric machine is determined as a function of the electrically possible target drive power. A drawback of this method is that the total efficiency is not taken into consideration during the load distribution.

German Preliminary Published Application DE 10 2008 037 241 A1 discloses a method and a system for controlling the powertrain of a vehicle having a hybrid drive. A cascade regulation controls the powertrain on the basis of the output. For this purpose, in a first plane, the requested target wheel power is corrected by means of the actual wheel power determined from a powertrain model based on a characteristic map. Then, in a second plane, the corrected actual wheel power undergoes a power distribution procedure that divides the corrected actual wheel power into a target value for the internal combustion engine and into a target value for the electric motor, and that, on this basis, derives an appertaining operating point of a coupling of a transmission. Then, in a third plane, for example, the rotational speed or the torque of the internal combustion machine and of the electric machine are appropriately regulated. A drawback here is that this method does not allow an efficiency-oriented load distribution.

SUMMARY OF THE INVENTION

The objective of the present invention is to put forward a method for determining a load distribution, a control unit for a powertrain, a powertrain and a motor vehicle so as to overcome the above-mentioned drawbacks, at least in part.

This objective is achieved according to the invention by the claimed method, by the claimed control unit, by the claimed powertrain and by the claimed motor vehicle.

According to a first aspect, the present invention puts forward a method for determining a load distribution in a powertrain of a motor vehicle, whereby the powertrain has at least two drive machines, whereby the first drive machine is provided for a front-wheel drive and the second drive machine is provided for a rear-wheel drive, whereby the method comprises: determining a load distribution characteristic map that is based on a first efficiency characteristic map of the first drive machine and on a second efficiency characteristic map of the second drive machine.

According to a second aspect, the present invention puts forward a control unit for a powertrain of a motor vehicle, whereby the powertrain has at least two drive machines, whereby the first drive machine is provided for a front-wheel drive and the second drive machine is provided for a rear-wheel drive, whereby the control unit is configured to carry out the method according to the first aspect.

According to a third aspect, the present invention puts forward a powertrain for a motor vehicle, whereby the powertrain has at least two drive machines, whereby the first drive machine is provided for a front-wheel drive and the second drive machine is provided for a rear-wheel drive, and whereby the powertrain comprises a control unit that is configured to carry out the method according to the first aspect.

According to a fourth aspect, the present invention puts forward a motor vehicle having a powertrain according to the third aspect.

Additional advantageous embodiments of the invention can be gleaned from the subordinate claims and from the description below of preferred embodiments of the present invention.

A method according to the invention for determining a load distribution in a powertrain of a motor vehicle, whereby the powertrain has at least two drive machines, whereby the first drive machine is provided for a front-wheel drive and the second drive machine is provided for a rear-wheel drive, comprises determining a load distribution characteristic map that is based on a first efficiency characteristic map of the first drive machine and on a second efficiency characteristic map of the second drive machine.

The vehicle can be an electric vehicle or else a hybrid vehicle that can have, for example, not only an electric machine, but also an internal combustion engine such as a gasoline engine, a diesel engine or an LPG engine.

The first drive machine is provided for the front-wheel drive and can power a front axle or a front wheel, for example, via a transmission and/or a coupling. Accordingly, in some embodiments, the first drive machine is also configured as a wheel hub motor or the like, and it can drive the front wheel directly.

The second drive machine is provided for the rear-wheel drive and can power a rear axle or a rear wheel, for example, via a transmission and/or a coupling. Accordingly, in some embodiments, the second drive machine is configured as a wheel hub motor or the like, and it can power the rear wheel directly.

Although the description below refers to a front axle and a rear axle, the present invention is not restricted to vehicles with two axles, but rather, some embodiments also relate to vehicles with more than two axles.

In some embodiments, the power of the first drive machine is less than the power of the second drive machine, without the present invention being restricted in this context, and in other embodiments, it is precisely the opposite.

The first or second efficiency characteristic map contains values that represent the efficiency of the first or second drive machine at various operating points. In this context, the efficiency characteristic map does not have to contain explicit efficiency values, but rather, it can also contain values that are directly or indirectly indicative of the efficiency. For example, the first or second efficiency characteristic map can also contain values that each represent a power loss at an appertaining operating point. Moreover, the efficiency characteristic map can contain values that originated from a conversion and that are thus only indirectly indicative of the efficiency at certain operating points. Moreover, the operating point can be represented by various values in the efficiency characteristic map, for example, by the rotational speed, the delivered power, the power uptake, the delivered torque, etc.

The load distribution characteristic map can be determined in that it is read out from a (volatile or read-only) memory or received via a data bus, via a network or the like. In some embodiments, the load distribution characteristic map is also determined by means of a calculation, whereby the calculation is based on the first and second efficiency characteristic maps.

The load distribution characteristic map contains values that allow a distribution of the load between the first drive machine and the second drive machine, so that all in all, an optimal (total) efficiency is achieved in the powertrain when the first drive machine and the second drive machine are appropriately controlled. In some embodiments, the load distribution characteristic map is three-dimensional, whereby, as a function of a rotational speed and of a (total) drive torque, it indicates an appertaining distribution of the load between the first drive machine and the second drive machine. Here, too, the values can be direct or indirect values that have been obtained, for example, through a transformation of rotational speed values, torques and/or load distribution values. Owing to the efficiency-optimized load distribution, a reduction in fuel consumption or an improvement in the range can be achieved.

In some embodiments, the load distribution characteristic map is based on a first and a second axle efficiency characteristic map or else it is determined on the basis of the first and second axle efficiency characteristic maps, whereby the first axle efficiency characteristic map is determined on the basis of the first efficiency characteristic map, and the second axle efficiency characteristic map is determined on the basis of the second efficiency characteristic map. The first or second axle efficiency characteristic map can be determined by incorporating additional parameters that can cause a loss on the path from the first or second drive machine to the axle or rotating wheel. For example, in some embodiments, a first transmission is provided for the first drive machine and a second transmission is provided for the second drive machine. When the first or second axle efficiency characteristic map is being determined, the efficiency loss that occurs due to the first or second transmission is then taken into account. In some embodiments, other factors that can influence the efficiency such as, for instance, friction losses that occur in wheel bearings, axle bearings and the like, can also be taken into account. In some embodiments, when different gear ratios are present (for example, because of different maximum drive machine rotational speeds), the different gear ratios for the first or second axle efficiency characteristic map are taken into account. Moreover, a transmission loss and/or a bearing loss or the like can be taken into account. Consequently, the use of the first or second axle efficiency characteristic map translates into an improved precision so that all in all, the efficiency can be further optimized.

Here, too, it is the case that the first/second axle efficiency characteristic map can be directly or indirectly indicative of the efficiency and, for instance, can also comprise power loss values or the like.

In some embodiments, the load distribution characteristic map is based on the calculation of linear combinations of the first axle efficiency characteristic map and the second axle efficiency characteristic map as a function of the drive torque of the first drive machine and of the second drive machine, whereby in some embodiments, the method contains this calculation, whereby linear combinations of the first axle efficiency characteristic map and the second axle efficiency characteristic map at which the total efficiency is at its maximum can be determined. In this manner, it is possible to determine load distributions at which the optimal total efficiency is achieved for various (total) axle torques.

In some embodiments, the linear combinations are determined for a plurality of prescribed rotational speeds, as a result of which a determination is made of the distribution of drive torques between the first or second drive machine at which the optimal total efficiency is achieved for the plurality of prescribed rotational speeds.

In some embodiments, the load distribution characteristic map is determined for a plurality of prescribed torques and for a plurality of prescribed rotational speeds. For this reason, in some embodiments, the load distribution characteristic map is available for all possible operating points of the vehicle.

In some embodiments, the first drive machine and the second drive machine are controlled on the basis of the load distribution characteristic map, so that all in all, an optimal total efficiency is achieved in that the load is optimally distributed between the first drive machine and the second drive machine. In some embodiments, the load is distributed optimally between the front axle and the rear axle (or correspondingly in other drive topologies).

In some embodiments, the load distribution is appropriately set by means of a vehicle control device (or control unit).

In some embodiments, the first efficiency characteristic map is determined by measuring the first drive machine, and/or the second efficiency characteristic map is determined by measuring the second drive machine. For this purpose, the motor vehicle or else the individual drive machines can be measured on a test bench, for example, in order to determine power losses as a function of the rotational speed, of the delivered torque or the like, so that, on this basis, the first or second efficiency characteristic map can be determined. As a result, the efficiency characteristic map can be determined very precisely.

In some embodiments, a fixed load distribution between the first drive machine and the second drive machine is provided according to the load distribution characteristic map, whereby in other embodiments, a dynamically adjustable load distribution between the drive machines is provided according to the load distribution characteristic map.

Some embodiments relate to a control unit for a powertrain of a motor vehicle, whereby the powertrain, as explained, has at least two drive machines, whereby the first drive machine is provided for a front-wheel drive and the second drive machine is provided for a rear-wheel drive, whereby the control unit is configured to carry out the method, as explained.

Here, the control unit is to be understood in functional terms and it can comprise, for example, control elements of a motor control unit, of a hybrid coordinator, of a battery management system, of a vehicle control device and the like. In some embodiments, the control unit comprises one or more (micro)processors, logic circuits and the like, a volatile and/or read-only memory in which, for instance, data that is needed for the method is stored, an interface for communication with other elements of the vehicle, for example, the first drive machine and the second drive machine, etc.

Some embodiments relate to a powertrain for a motor vehicle, whereby the powertrain has at least two drive machines, whereby the first drive machine is provided for a front-wheel drive and the second drive machine is provided for a rear-wheel drive, and whereby the powertrain has a control unit that is configured to carry out the method, as explained.

In some embodiments, the powertrain also comprises a front axle and a rear axle, whereby the first drive machine is configured to power the front axle and the second drive machine is configured to power the rear axle, as was already explained above.

In some embodiments, as was already explained above, the first drive machine is an electric machine and/or the second drive machine is an electric machine. For example, the electric machine can be an asynchronous machine or a permanently excited synchronous machine or the like.

Some embodiments relate to a motor vehicle with a powertrain, as explained.

BRIEF DESCRIPTION OF THE DRAWINGS

Embodiments of the invention will now be described by way of example, making reference to the accompanying drawing, in which.

DETAILED DESCRIPTION OF THE INVENTION

Figure 1:
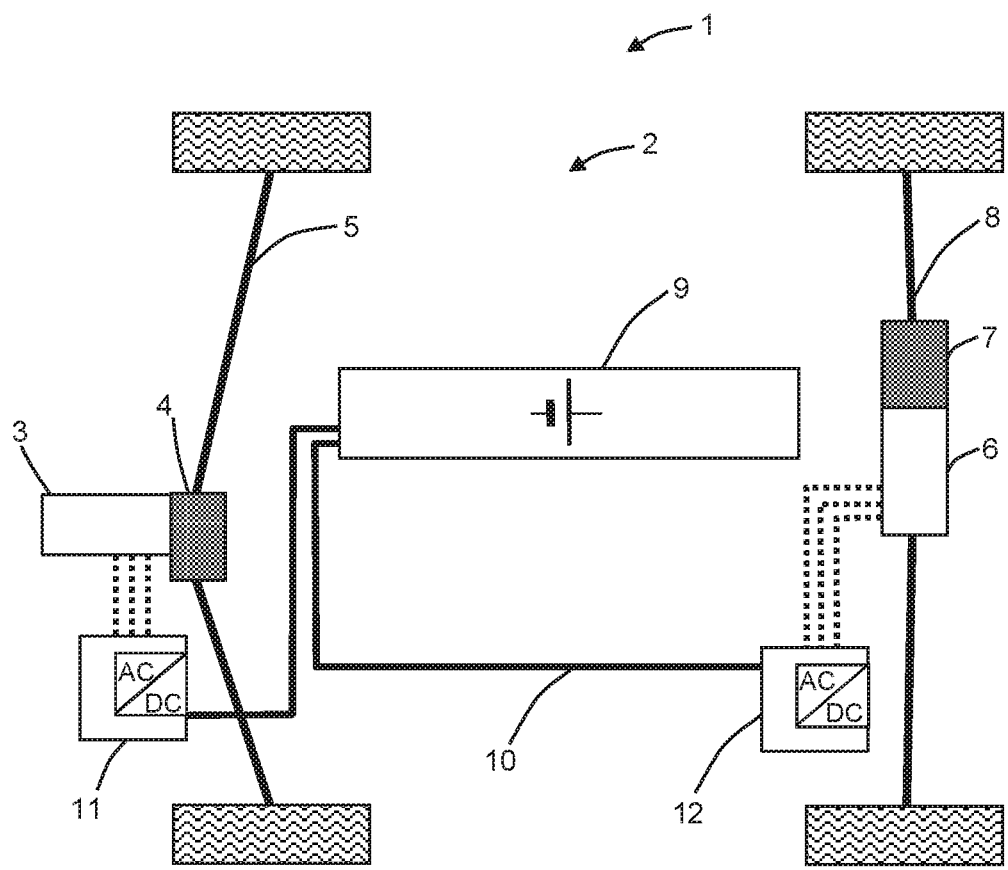
FIG. 1 schematically shows an embodiment of a motor vehicle with a powertrain.

An embodiment of a motor vehicle 1 with a powertrain 2 is schematically shown in FIG. 1.

The powertrain 2 has a first drive machine 3, which is an electric machine and which is configured as a front (axle) drive. The first drive machine 3 powers a front axle 5 of the powertrain 2 via a first transmission 4.

The powertrain 2 also has a second drive machine 6, which is an electric machine and which is configured as a rear (axle) drive. The second drive machine 6 powers a rear axle 8 of the powertrain 2 via a second transmission 7.

An electric energy storage device 9, which is configured as a lithium-ion high-voltage battery, is connected to the first drive machine 3 and to the second drive machine 6 via a high-voltage on-board network 10. The electric energy storage device 9 has, for example, 96 lithium-ion cells and an integrated battery management system. Moreover, a first electric power converter 11 is coupled between the first drive machine 3 and the electric energy storage device 9, and a second power converter 12 is coupled between the second drive machine 6 and the electric energy storage device 9. For example, a charging socket with a charging device can be connected to the second power converter 12 in order to externally charge the electric energy storage device 9.

Figure 2:
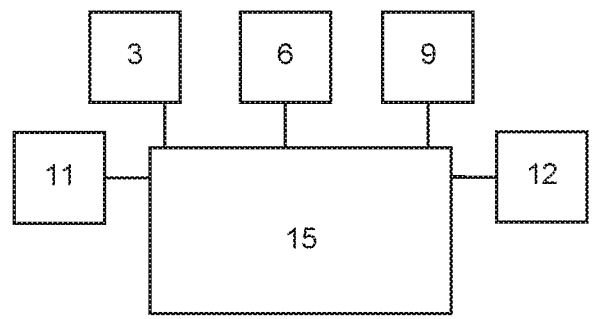
FIG. 2 schematically shows an embodiment of a control unit.
Figure 3:
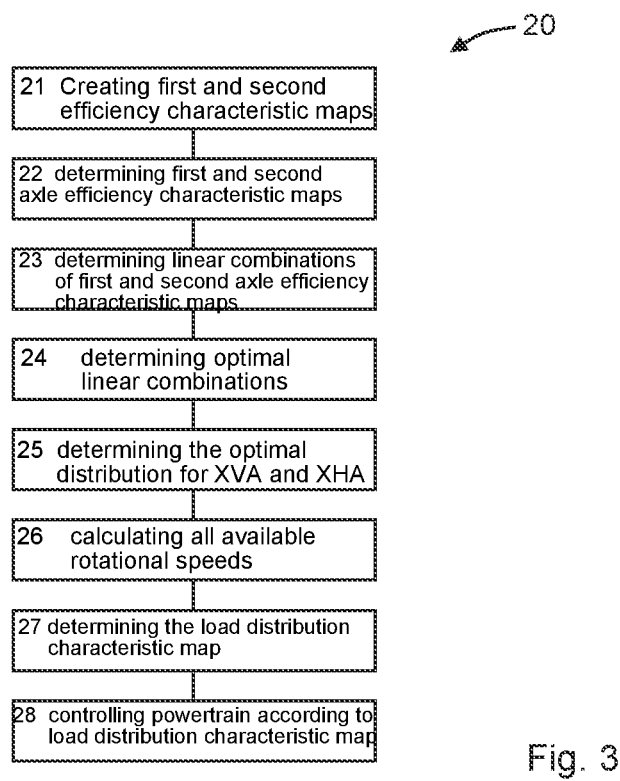
FIG. 3 schematically shows a flow diagram of an embodiment of a method for load distribution.

FIG. 2 schematically shows a control unit 15 that is designed to control the motor vehicle 1 and that is configured to carry out the method described here.

The control unit 15 is connected to the individual components of the motor vehicle 1 that are to be controlled, namely, to the first drive machine 3, to the second drive machine 6, to the electric energy storage device 9, to the electric power converters 11 and 12, and to other components, which have been omitted here for the sake of simplification.

Below, a method 20 for controlling the motor vehicle 1 or its powertrain 2, or for determining the load distribution is described, which serves to bring about the described load distribution between the first drive machine and the second drive machine, whereby the method 20 is explained with reference to the motor vehicle 1 of FIG. 1, without restricting the present invention thereto.

In Step 21, a first efficiency characteristic map and a second efficiency characteristic map are created on a test bench for the first drive machine 3 and for the second drive machine 6 in that the appertaining power losses for the appertaining torques and rotational speeds of the appertaining drive machine are determined. Moreover, in each case, the maximum torque capacity $M_{max}$ for the first drive machine and for the second drive machine is determined. The efficiency characteristic map can also take into account losses that occur, for example, due to an inverter or due to other components. As a result, the various optimal characteristic map ranges for the first drive machine 3 and for the second drive machine 6 can be determined as a function of the operating point.

Then, in Step 22, a first axle efficiency characteristic map based on the first efficiency characteristic map is determined for the first drive machine 3 and a second axle efficiency characteristic map based on the second efficiency characteristic map is determined for the second drive machine 6 in that, for the first axle efficiency characteristic map, the gear ratio and the efficiency of the appertaining transmission 4 are taken into account, and in that, for the second axle efficiency characteristic map, the gear ratio and the efficiency of the appertaining transmission 7 are taken into account. The first or the second axle efficiency characteristic map then applies on the axle level in terms of the axle rotational speed and wheel torque of the appertaining axle. Here, the axle efficiency characteristic maps are also power loss characteristic maps since they represent the losses that occur on the path between the first drive machine and the second drive machine on the path to the axle or on the path to the wheel.

In Step 23, linear combinations of the first and second axle efficiency characteristic maps are determined at a prescribed rotational speed, as a result of which a sum characteristic map is obtained:

$$M_G = X_{HA} * M_{HA,max} + X_{VA} * M_{VA,max}$$

wherein $M_G$ stands for the total axle torque at the prescribed rotational speed that is delivered by the first drive machine 3 and by the second drive machine 6, $X_{HA}$ is a number between 0 and 1, and it represents the portion of the total axle torque $M_G$ that is contributed by the maximum torque $M_{HA,max}$ of the second drive machine 6 (rear axle), and $X_{VA}$ is a number between 0 and 1, and it represents the portion of the total axle torque $M_G$ that is contributed by the maximum torque $M_{HA,max}$ of the first drive machine 3 (front axle). In other embodiments, the determination is carried out in the opposite order, that is to say, to start with, all of the rotational speeds are computed in order to determine the efficiency characteristic maps and the linear combinations at a prescribed torque, and then the efficiency characteristic maps and linear combinations are determined for the various torques.

Figure 4:
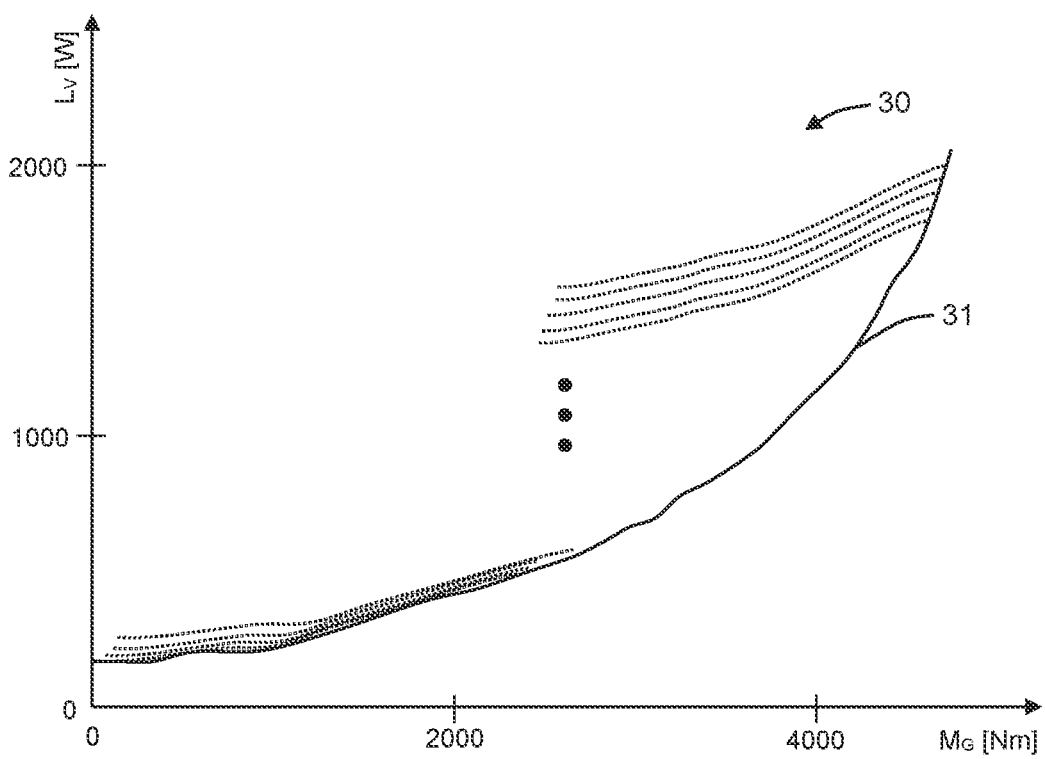
FIG. 4 shows the linear combinations of axle efficiency characteristic maps.

FIG. 4 shows such a linear combination 30, whereby FIG. 4 shows the total axle torque $M_G$ in Nm on the abscissa, and the power loss $L_V$ in watts is shown on the ordinate for the first drive machine 3 and for the second drive machine 6 combined, as is obtained from the first and second axle efficiency characteristic maps.

Each linear combination 30, whereby FIG. 4 only shows a few of them, then represents the power loss curve at a certain rotational speed and for appertaining different total axle torques $M_G$, whereby all of the available axle torques are computed for the first drive machine and for the second drive machine.

In Step 24, the optimal linear combinations (that is to say, minimal losses in the total drive) are now determined, as is also shown in FIG. 4 by the curve 31, which (at a prescribed rotational speed), in each case, shows the linear combination with the lowest total power loss $L_V$ for a total axle torque $M_G$, and thus with the best (optimal) efficiency.

Figure 5:
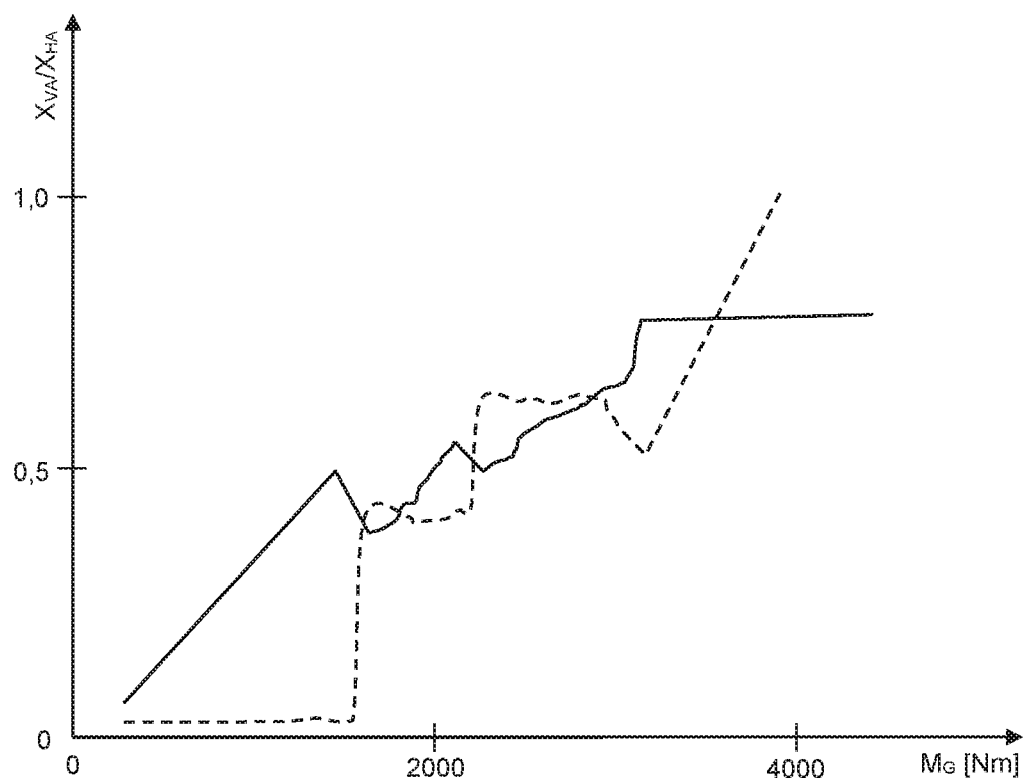
FIG. 5 shows optimal distributions for a load distribution.

In Step 25, in each case at the prescribed rotational speed, the optimal distribution is determined for $X_{VA}$ and $X_{HA}$, as is also shown in FIG. 5. FIG. 5 shows the total axle torque $M_G$ on the abscissa and values between 0 and 1 on the ordinate.

The solid line in FIG. 5 represents the values for $X_{VA}$, and the broken line represents the values for $X_{HA}$, as can be seen from the appertaining curve 31. Thus, in FIG. 5, in each case for a given total axle torque $M_G$, the appertaining optimal values for $X_{HA}$ and $X_{VA}$ at the prescribed rotational speed are shown, whereby $X_{HA}$ and $X_{VA}$ represent the appertaining load portions for the second drive machine and for the first drive machine.

Figure 6:
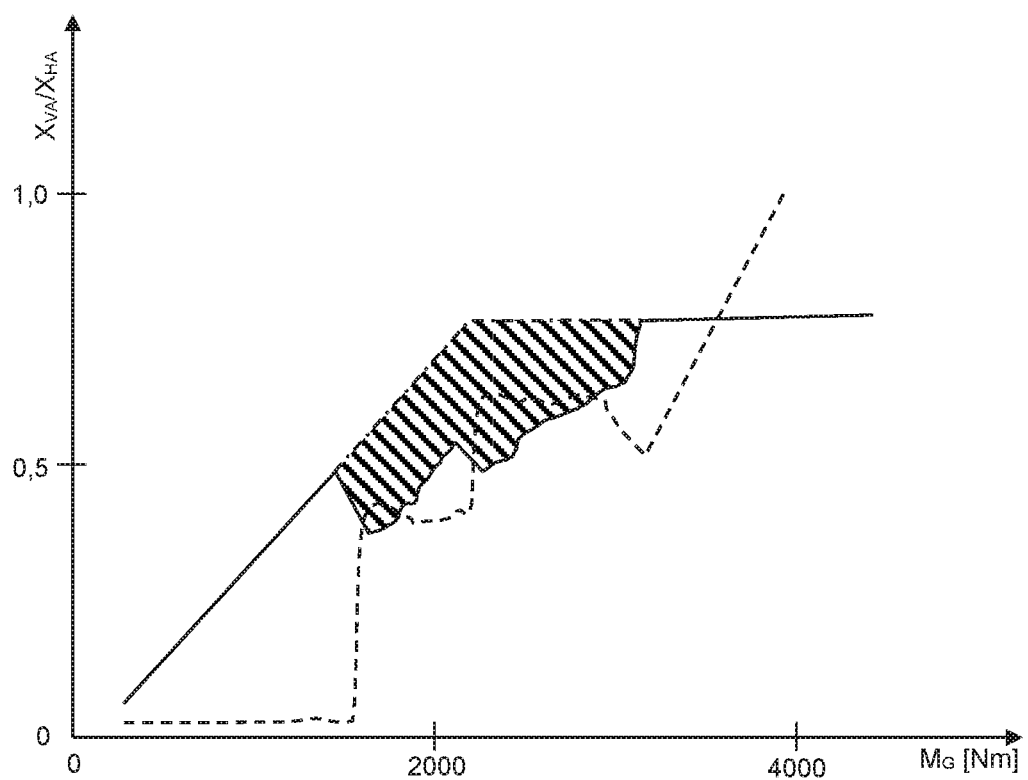
FIG. 6 shows an area of a load point shift in the depiction of FIG. 6.

FIG. 6 corresponds to the depiction of FIG. 5, except that in FIG. 6, a diagonally shaded area represents an area of the load point shift at which the load is shifted from the rear axle to the front axle. After all, for instance, if one were to simply linearly continue the curve of $X_{HA}$ (solid line), then one would obtain the curve shown in FIG. 6 (dot-dash line in FIG. 6) until a maximum value of $X_{HA}$ would be reached, which results from the maximum power of the second drive machine (straight course of the dot-dash line in FIG. 6).

The shaded area in FIG. 6 shows that, as far as the total efficiency is concerned, it makes more sense to lower the load of the second drive machine and to add power to the first drive machine.

In Step 26, the total calculation for all of the (available) rotational speeds is carried out so that a load distribution characteristic map is obtained for all of the axle torques and rotational speeds and thus, in Step 27, the load distribution characteristic map is determined accordingly. In Step 28, the powertrain 2 is controlled according to the determined load distribution characteristic map in that, for example, for the first and second drive machines, an appertaining actuation characteristic map is derived that indicates the proportional load for the appertaining drive in each case.

FIGS. 7 through 10 then present examples of load distribution characteristic maps, whereby the abscissa shows the axle rotational speed D in rpm and the ordinate shows the appertaining axle torque M in Nm. In each of FIGS. 7 through 10, there is a scale on the right-hand side indicating the torque portion, whereby the uppermost shading (dots) shows the torque portion from 0.75 to 1, the diagonal shading shows the torque portion from 0.5 to 0.75, the wavy shading shows the torque portion from 0.25 to 0.5, and the checkered shading shows the torque portion from 0 to 0.25. Moreover, in each case, a vertical line shows an axle rotational speed, which here is, for instance, 750 rpm and which applies to FIGS. 5 and 6. In other embodiments, the scale can, of course, be finer and the coarse scale here serves only to simplify the depiction.

Figure 7:
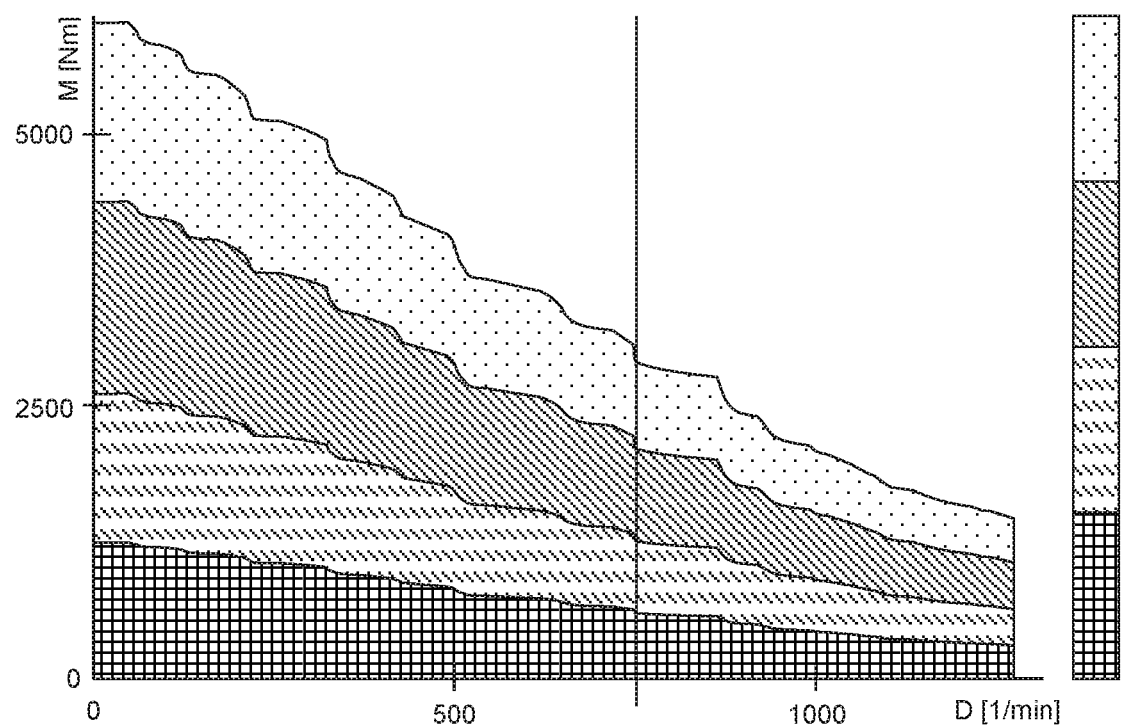
FIG. 7 shows a characteristic map for the capacity utilization of a rear-wheel drive.

Purely by way of example, FIG. 7 shows the capacity utilization of the second drive machine (rear axle), in other words, $M_{HA}/M_{HA,max}$. As one can see from the characteristic map of FIG. 7, for example, the capacity utilization of the second drive machine at very low axle rotational speeds (e.g. below 100) and at very low torques (e.g. below 100) is almost zero (area with the checkered shading), that is to say, the second drive machine is practically not being used, in contrast to which at very high axle rotational speeds, for example, at the vertical line and at a very high axle torque, for example, at about 3000, the capacity utilization of the second drive machine is 100% (area with the dotted shading).

Figure 8:
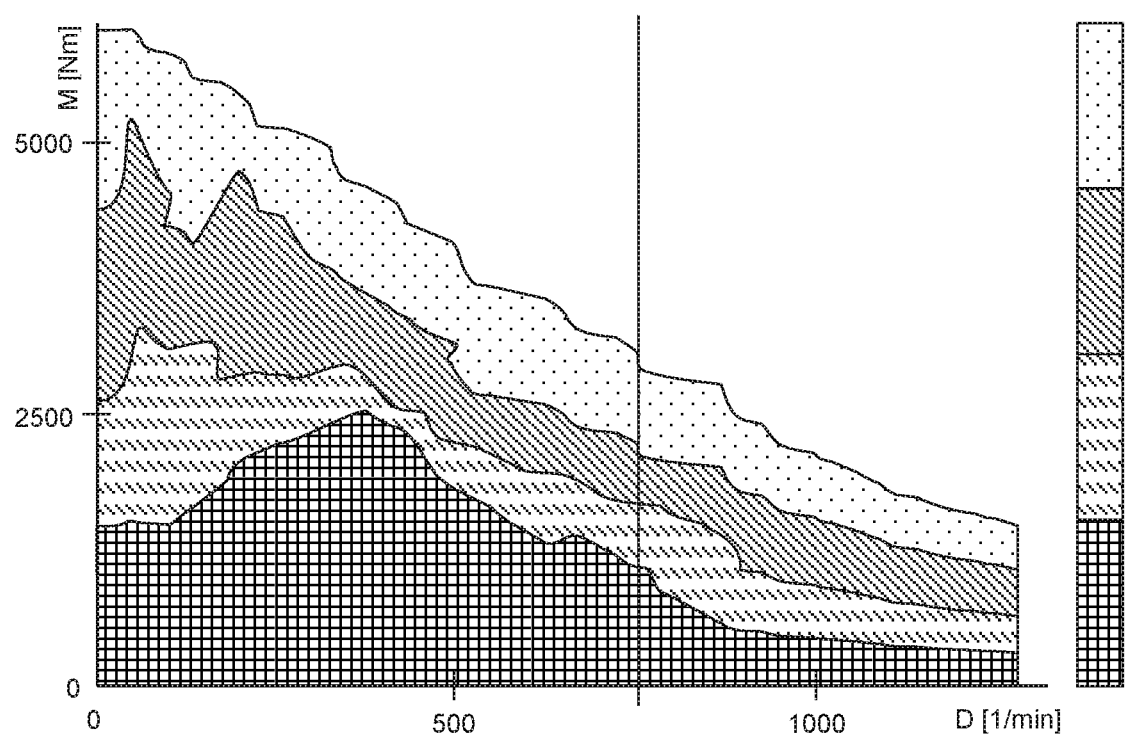
FIG. 8 shows a characteristic map for the capacity utilization of a front-wheel drive.

Purely by way of example, FIG. 8, like FIG. 7, shows the capacity utilization of the first drive machine (front axle), in other words, $M_{VA}/M_{VA,max}$. As one can see from the characteristic map of FIG. 8, especially in comparison to FIG. 7, there is a large area (checkered shading) in which the torque portion of the first drive machine is small or practically zero, that is to say, in that area, the axle torque is being delivered essentially only by the second drive machine.

Figure 9:
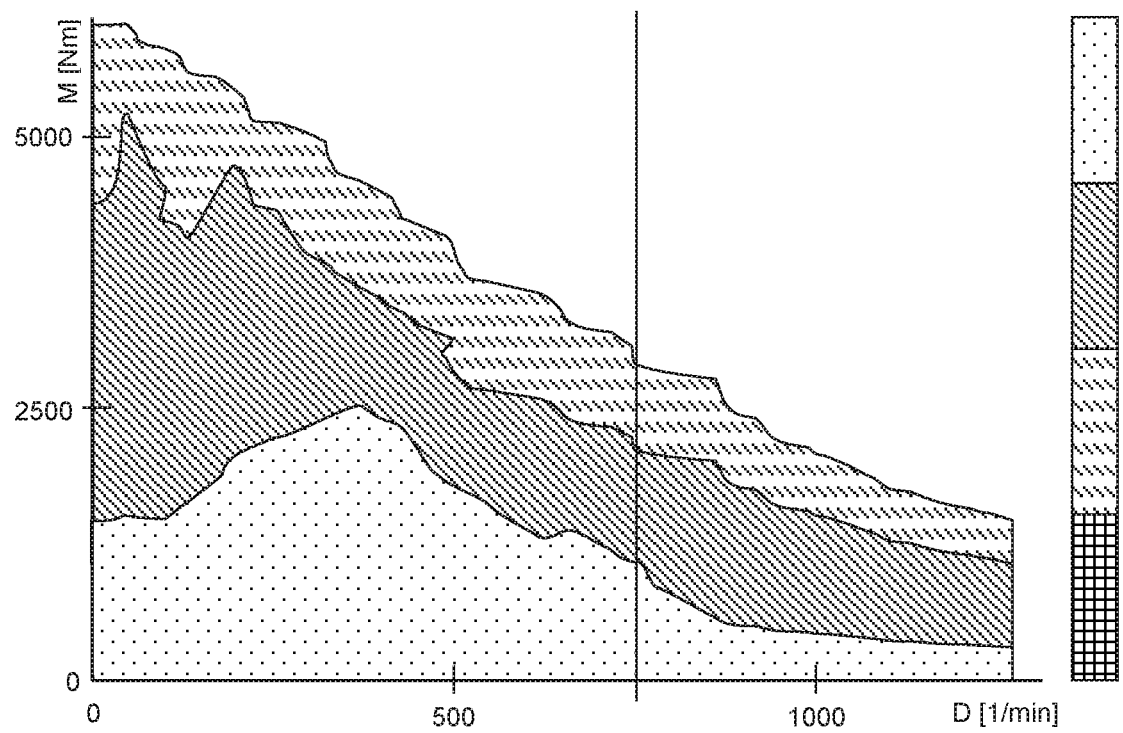
FIG. 9 shows a characteristic map for the torque portion of the rear-wheel drive.

Purely by way of example, FIG. 9 shows the torque portion of the total axle torque, in other words, $M_{axle,HA}/M_{axle,total}$, contributed by the second drive machine (rear axle). As one can see from the characteristic map of FIG. 9, in the area with the dotted shading, the portion contributed by the second drive machine is high (almost or equal to one), so that in that area, essentially only the second drive machine is delivering the torque.

Figure 10:
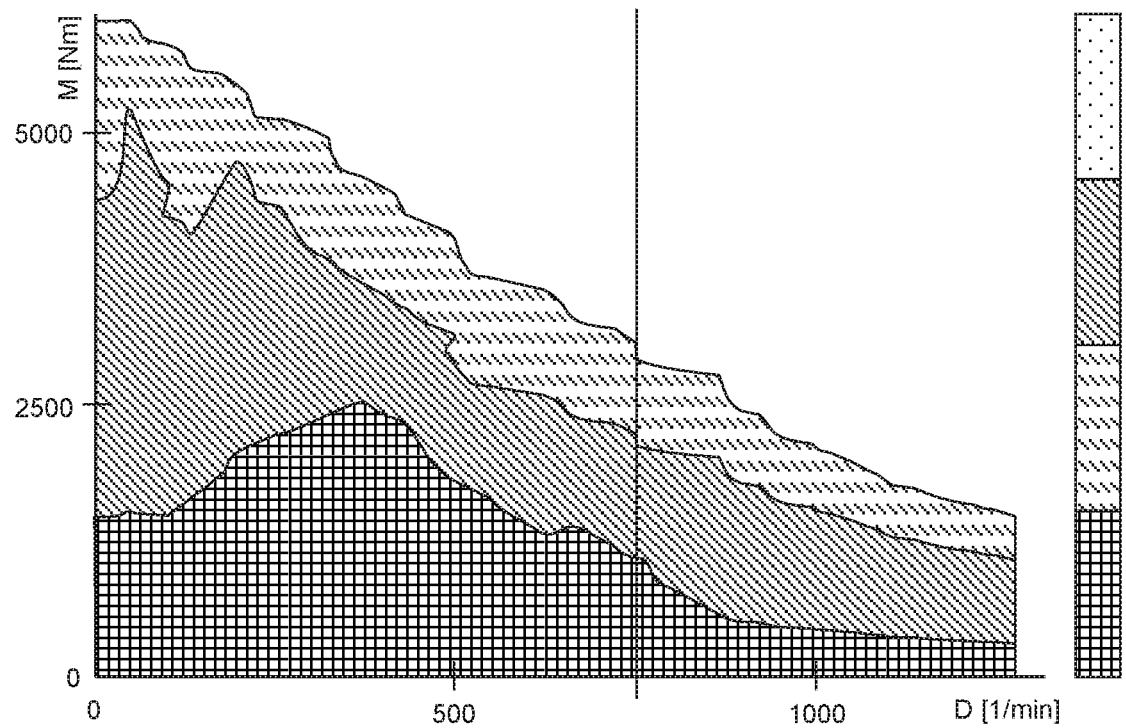
FIG. 10 shows a characteristic map for the torque portion of the front-wheel drive.

Purely by way of example, FIG. 10 shows the torque portion of the total axle torque, in other words, $M_{axle,VA}/M_{axle,total}$, contributed by the first drive machine (front axle). As one can see from the characteristic map of FIG. 10, in the area with the checkered shading, the portion contributed by the first drive machine is small (almost or equal to zero), so that, in that area, the first drive machine is essentially being carried along and is not delivering any torque.

In general, in some embodiments, not all of the values for characteristic maps are measured or calculated, and any intermediate values that might be required are determined, for example, by means of interpolation, as is generally known and usual for characteristic maps.

LIST OF REFERENCE NUMERALS 1 motor vehicle
2 powertrain
3 first drive machine
4 first transmission
5 front axle
6 second drive machine
7 second transmission
8 rear axle
9 energy storage device
10 high-voltage on-board network
11 first electric power converter
12 second electric power converter
15 control unit
20 method
21 determining the first and second efficiency characteristic maps
22 determining the first and second axle efficiency characteristic maps
23 calculating the linear combinations of the first and second axle efficiency characteristic maps
24 determining optimal linear combinations
25 determining optimal distribution
26 expanding to all rotational speeds
27 determining the load distribution characteristic map
28 controlling the powertrain
30 linear combinations
31 curve showing lowest total loss

The invention claimed is:

1. A method for determining and controlling a load distribution in a powertrain of a motor vehicle, whereby the powertrain has at least two drive machines, wherein the first drive machine is provided for a front-wheel drive and the second drive machine is provided for a rear-wheel drive, wherein the method comprises:
determining a load distribution characteristic map that is based on a first efficiency characteristic map of the first drive machine and on a second efficiency characteristic map of the second drive machine; and
controlling the load distribution between the first drive machine and the second drive machine on the basis of the load distribution characteristic map;
wherein the load distribution characteristic map is based on a first and a second axle efficiency characteristic map, the first axle efficiency characteristic map being determined on the basis of the first efficiency characteristic map and the second axle efficiency characteristic map being determined on the basis of the second efficiency characteristic map, and
wherein at least one of the first and the second axle efficiency characteristic map is determined taking into account at least one of: a differing gear ratio, and a bearing loss.

2. The method according to claim 1, wherein the load distribution characteristic map is based on the calculation of linear combinations of the first axle efficiency characteristic map and the second axle efficiency characteristic map as a function of a drive torque of the first drive machine and of the second drive machine.

3. The method according to claim 2, further comprising determining linear combinations of the first axle efficiency characteristic map and the second axle efficiency characteristic map at which the load distribution in the powertrain of the motor vehicle is optimized.

4. The method according to claim 2, wherein the linear combinations are determined for a plurality of prescribed rotational speeds.

5. The method according to claim 1, wherein the load distribution characteristic map is determined for a plurality of prescribed torques and for a plurality of prescribed rotational speeds.

6. The method according to claim 1, wherein the first drive machine and the second drive machine are controlled on the basis of the load distribution characteristic map.

7. The method according to claim 1, wherein at least one of:
the first efficiency characteristic map is determined by measuring the first drive machine; and the second efficiency characteristic map is determined by measuring the second drive machine.

8. A powertrain for a motor vehicle, wherein the powertrain has at least two drive machines, wherein the first drive machine is provided for a front- wheel drive and the second drive machine is provided for a rear-wheel drive, and wherein the powertrain has a control unit that is configured to:
determine a load distribution characteristic map that is based on a first efficiency characteristic map of the first drive machine and on a second efficiency characteristic map of the second drive machine; and,
control the load distribution between the first drive machine and the second drive machine on the basis of the load distribution characteristic map;
wherein the load distribution characteristic map is based on a first and a second axle efficiency characteristic map, the first axle efficiency characteristic map being determined on the basis of the first efficiency characteristic map and the second axle efficiency characteristic map being determined on the basis of the second efficiency characteristic map, and
wherein at least one of the first and the second axle efficiency characteristic map is determined taking into account at least one of: a differing gear ratio, and a bearing loss.

9. The powertrain according to claim 8, further comprising a front axle and a rear axle, wherein the first drive machine is configured to power the front axle and the second drive machine is configured to power the rear axle.

10. The powertrain according to claim 9, wherein at least one of: the first drive machine is an electric machine; and the second drive machine is an electric machine.

11. A motor vehicle having a powertrain,
wherein the powertrain has at least two drive machines, wherein the first drive machine is provided for a front-wheel drive and the second drive machine is provided for a rear-wheel drive, and
wherein the powertrain has a control unit that is configured to:
determine a load distribution characteristic map that is based on a first efficiency characteristic map of the first drive machine and on a second efficiency characteristic map of the second drive machine; and, control the load distribution between the first drive machine and the second drive machine on the basis of the load distribution characteristic map;

wherein the load distribution characteristic map is based on a first and a second axle efficiency characteristic map, the first axle efficiency characteristic map being determined on the basis of the first efficiency characteristic map and the second axle efficiency characteristic map being determined on the basis of the second efficiency characteristic map, and wherein at least one of the first and the second axle efficiency characteristic map is determined taking into account at least one of: a differing gear ratio, and a bearing loss.

\* \* \* \* \*